United States Patent
Kozuka et al.

[11] Patent Number: 6,055,859
[45] Date of Patent: May 2, 2000

[54] NON-CONTACT MICROMANIPULATION METHOD AND APPARATUS

[75] Inventors: Teruyuki Kozuka, Okazaki; Hideto Mitome, Aichi-ken; Toru Tuziuti, Nagoya, all of Japan

[73] Assignees: Agency of Industrial Science and Technology; Agency Ministry of International Trade and Industry, both of Tokyo, Japan

[21] Appl. No.: 08/939,001

[22] Filed: Sep. 26, 1997

[30] Foreign Application Priority Data

Oct. 1, 1996 [JP] Japan ................................. 8-281497

[51] Int. Cl.[7] ........................................... B01D 17/06
[52] U.S. Cl. ........................ 73/570; 210/748; 73/432.1; 55/15; 55/277
[58] Field of Search ........................ 210/748, 738, 210/188; 209/155; 406/198; 367/137, 138, 191; 55/15, 277; 73/570, 432.1, 61.75, 64.53, 865.5, 626

[56] References Cited

U.S. PATENT DOCUMENTS

| | | | |
|---|---|---|---|
| 4,877,516 | 10/1989 | Schram | 209/155 |
| 4,983,189 | 1/1991 | Peterson et al. | 210/748 |
| 5,033,033 | 7/1991 | Schram | 367/191 |
| 5,085,783 | 2/1992 | Feke et al. | 210/748 |
| 5,164,094 | 11/1992 | Stuckart | 210/748 |
| 5,225,089 | 7/1993 | Benes et al. | 210/748 |
| 5,484,537 | 1/1996 | Whitworth | 210/748 |
| 5,831,166 | 11/1998 | Kozuka et al. | 73/570 |

*Primary Examiner*—Hezron Williams
*Assistant Examiner*—Rose M. Miller
*Attorney, Agent, or Firm*—Oblon, Spivak, McClelland, Maier & Neustadt, P.C.

[57] ABSTRACT

A method of non-contact micromanipulation using ultrasound includes disposing in a liquid medium in which micro particles are distributed, an ultrasound transducer comprising a transducer plate, a surface electrode wholly covering a first principal surface of the transducer plate and a reverse surface electrode on a second principal surface of the transducer plate comprising a plurality of short electrode strips arranged in parallel, and a reflector set in parallel opposition to the first principal surface of the transducer plate from which the reflector is spaced apart by a prescribed distance, applying a voltage to at least one electrode strip selected from the plurality of electrode strips to radiate ultrasound to form a standing wave field between the ultrasound transducer and the reflector to trap micro particles, and electrically switching the voltage being applied to the selected electrode strip to an adjacent electrode strip to move the standing wave field by moving a position of ultrasound radiated by the ultrasound transducer to thereby move the trapped micro particles in a direction in which the electrode strips are arrayed.

6 Claims, 5 Drawing Sheets

NON-CONTACT MICROMANIPULATION METHOD AND APPARATUS

BACKGROUND OF THE INVENTION

1. Field of the Invention

This invention relates to a micromanipulation method for handling micro particles. More particularly, the invention relates to a method of non-contact micromanipulation using ultrasound, and to a non-contact micromanipulation apparatus implementing said method.

2. Description of the Prior Art

In various fields such as biotechnology, materials development, micromachinery and the like there has been a strong need for a method of manipulating micro particles. This has led to research into and development of such a method. In addition to being commercially advantageous, such a micromanipulation method needs to take into account the special nature of matter at the micro level.

At the micro level, forces such as the forces arising from friction between solids or the viscosity of liquids become more dominant than inertial forces. In addition to this, while microscopic particles of dust and the like can be ignored at the normal, non-microscopic level, they form major obstructions that cannot be ignored when it comes to the manipulation of micro particles. As a result, methods of trapping and moving micro particles do not work well when a manipulator is used that is simply a scaled down version of a mechanical manipulator used to handle objects on a normal scale, that is, on a non-microscopic scale.

To resolve the special problems involved in handling objects at the micro level, a number of non-contact micromanipulation methods have been proposed that use electrostatic force, laser beam radiation pressure or other such forces to effect the desired manipulation. In addition to resolving the above problems, such non-contact methods have the excellent effect of preventing the objects being manipulated from being contaminated by the manipulation. However, each of the methods has its own particular drawbacks.

Among the problems of the method of micromanipulation using electrostatic force are that it has a short functional distance, that electrolysis arises in the electrodes, and that the objects and atmosphere being manipulated are subject to limitations relating to conductivity.

The method of micromanipulation using laser beam radiation pressure is limited to objects that transmit or refract light. Also, the force produced by the laser beam radiation pressure is so small that it can only be used to manipulate extremely small objects. Among further drawbacks are that the method requires costly equipment, and that care must be taken to ensure that the human body is protected from harm.

However, it is well-known that when an object is placed in an ultrasonic wave field formed in a fluid medium, acoustic radiation pressure is produced around the object, with a force acting on the object being dependent on where the object is located. When for example the sound field is a traveling wave, the acoustic radiation pressure causes the object in the medium to be subjected to the force of a pressure acting in the direction of the ultrasonic traveling wave.

In the fluid medium an ultrasonic wave field can be obtained as a one-dimensional standing wave formed by the superposition of two plane waves traveling in opposite directions that have the same frequency and amplitude. It is also well-known that provided the object (hereinafter referred to as a micro particle) is sufficiently smaller than the wavelength of the standing wave, the ultrasonic radiation force produced around the micro particle urges the micro particle toward the nearest of dynamically stable positions located at half wavelength intervals. In the case of round micro particles, the positions of dynamically stable locations are determined by the negative or positive value of prescribed parameters determined by the medium, the micro particles and their density and compressibility. In the case of the positive value, nodes in the sound pressure distribution of the one-dimensional standing wave become dinamically stable locations, whereas antinodes therein become dinamically stable locations in the case of the negative value. For example, when the micro particles have a density greater than the density of the medium and a compressibility that is lower than that of the medium, the nodes will become dynamically stable locations, and conversely, when the micro particles have a density lower than the density of the medium and a compressibility that is higher than that of the medium, the antinodes will become dynamically stable locations.

A number of manipulation methods using the radiation force of an ultrasound traveling or standing wave have been studied. Since in these methods the ultrasonic radiation force is produced by spatial changes in the energy density of the sound waves in the medium, it follows that if it were done in the medium in which the sound waves were propagated, it would be possible to utilize the radiation force. This had the major additional advantage of expanding the range of particles that could be manipulated so long as the particles had a different acoustic impedance from that of the medium and therefore reflected or absorbed the sound waves. Among other advantages are that the cost of the apparatus is relatively low, and that the fact that ultrasonic waves can be blocked by providing a layer of air between the liquid medium and any human body means that it is easy to ensure safety.

In U.S. patent application Ser. No. 726,300 the present inventors disclose manipulation of micro particles using ultrasound. Standing ultrasonic waves were generated in water by using a concave transducer to radiate ultrasonic waves and a reflector to reflect the ultrasonic waves. Using the radiation force of the standing ultrasonic wave fields, alumina particles suspended in the water were agglomerated and trapped at half wavelength intervals in small regions in the vicinity of nodes along the standing wave sound pressure distribution axis of the transducer forming dynamically stable points, and the particle agglomerations thus trapped at each node were then moved along the center axis by varying the frequency of the ultrasonic waves.

With this micromanipulation method the alumina particles can thus be agglomerated and trapped at half wavelength intervals in the vicinity of nodes along the standing wave sound pressure distribution axis of the transducer, and the trapped particles moved along the center axis by varying the intervals between the nodes in the standing wave sound pressure distribution by varying the frequency of the ultrasonic waves. However, drawbacks are that the standing wave field cannot be moved in a direction perpendicular to the center axis, that is, in a direction parallel to the operating surface of the transducer, and that the trapped particles cannot be moved in a direction parallel to the operating surface of the transducer.

An object of the present invention is to provide a method of non-contact micromanipulation using ultrasound that enables micro particles to be trapped at prescribed small regions and enables the trapped micro particles to be moved in a direction that is substantially parallel to the operating surface of the ultrasound transducer, and a non-contact micromanipulation apparatus implementing said method.

SUMMARY OF THE INVENTION

The present invention attains the above object by providing a method of non-contact micromanipulation using ultrasound, comprising:

disposing in a liquid medium in which micro particles are distributed, an ultrasound transducer comprising a transducer plate, a surface electrode wholly covering a first principal surface of the transducer plate and a reverse surface electrode on a second principal surface of the transducer plate comprising a plurality of short electrode strips arranged in parallel, and a reflector set in parallel opposition to the first principal surface of the transducer plate from which the reflector is spaced apart by a prescribed distance, applying a voltage to at least one electrode strip selected from the plurality of electrode strips to radiate ultrasound to form a standing wave field between the ultrasound transducer and the reflector to trap micro particles, electrically switching the voltage being applied to the selected electrode strip to an adjacent electrode strip to move the standing wave field by moving a position of ultrasound radiated by the ultrasound transducer to thereby move the trapped micro particles in a direction in which the electrode strips are arrayed.

The present invention also provides an apparatus for non-contact micromanipulation implementing the above method, the apparatus comprising:

an ultrasound transducer disposed in a liquid medium in which micro particles are distributed, the ultrasound transducer comprising a transducer plate, a surface electrode wholly covering a first principal surface of the transducer plate and a reverse surface electrode on a second principal surface of the transducer plate comprising a plurality of short electrode strips arranged in parallel, a reflector set in the liquid medium in parallel opposition to the first principal surface of the transducer plate from which the reflector is spaced apart by a prescribed distance, a standing wave field being formed between the ultrasound transducer and the reflector by ultrasound radiated by the ultrasound transducer, switching means to selectively switch an applied voltage to the plurality of electrode strips, and control means for controlling the selectively switching operation of the switching means.

In the non-contact manipulation method according to the present invention, the ultrasound transducer is driven to radiate ultrasound by applying a voltage just to selected electrode strips selected from the array of short, independent electrode strips that constitute the reverse surface electrode of the ultrasound transducer. This results in the formation of a standing wave field between the driven electrode strip of the ultrasound transducer and the reflector. Thus, micro particles distributed in the liquid medium are trapped in small regions in the vicinity of nodes and antinodes located at half wavelength intervals in the ultrasonic standing wave field formed in the liquid medium, centering on the driving electrode strips in the direction in which the electrode strips are arrayed.

Thus, by electrically switching the driving electrode to the adjacent electrode the standing wave location can be moved in the direction in which the electrode strips are arrayed, which also moves the trapped micro particles in the same direction, which is parallel to the ultrasonic radiating surface of the ultrasound transducer. The distance by which trapped micro particles are moved will therefore be more or less proportional to the number of electrode strips that are switched and the spacing of the electrode strips. Trapped micro particles can be moved a required distance by repeating the operation of switching the driving voltage from electrode strip to electrode strip a required number of times.

In accordance with a first preferred aspect of the invention in which the selected electrode strips are an array of two or more adjacent electrode strips, the standing wave field is moved by applying a voltage to the electrode strip at one end of the array of two or more adjacent electrode strips while switching off the voltage to the electrode strip located at the other end of the array of two or more adjacent electrode strips. As a result, the width of the standing wave field in the direction of the array of electrode strips is increased by an amount that corresponds to the number of electrode strips to which a voltage is simultaneously applied, and the expanded standing wave field is moved by the unit amount of movement provided by one electrode strip.

In accordance with a second preferred aspect of the invention, the selected electrode strips are two adjacent electrode strips to which different voltages are applied, whereby in accordance with the ratio between the voltage applied to one of the two electrode strips and the voltage applied to the other of the two electrode strips, the point along the electrode strip array at which the standing wave field sound pressure is at its highest is shifted from the central axis of the ultrasound transducer where the two electrode strips are located toward the electrode strip having the higher applied voltage.

In accordance with a third preferred aspect of the invention, the selected electrode strips are two adjacent electrode strips, ultrasound corresponding to ultrasonic waves generated via the two electrode strips is radiated as burst waves, and the burst waves generated via the electrode strips are given a different duty ratio. As a result, in accordance with the ratio between the duty ratio of burst waves radiated via one of the two electrode strips and the duty ratio of burst waves radiated via the other of the two electrode strips, the point along the electrode strip array at which the standing wave field sound pressure is at its highest is shifted from the central axis of the ultrasound transducer where the two electrode strips are located toward the electrode strip with the higher duty ratio. Since radiating burst waves causes standing wave fields to be formed intermittently at time intervals that are substantially equal to the duty ratio of the burst waves in the medium, the driving force of the medium flow referred to as the acoustic streaming that can be considered as being proportional to the time-average square of the sound field pressure amplitude can be decreased, allowing the acoustic streaming velocity to be adequately controlled while at the same time maintaining the radiation force of the ultrasonic standing wave field that traps the micro particles and can be considered as being proportional to the square of the sound field pressure amplitude.

As described in the foregoing, in accordance with the present invention non-contact trapping and movement of micro particles suspended in a liquid are enabled, making the invention applicable in various ways. As one example, it can be used for biotechnology applications involving the manipulation of cells and blood components. It could also be used for non-contact manipulation of organic particles in research into improving plant varieties. High purity and uniformity of micro particles of raw material are required in the field of inorganic materials. Since the forces at work in an ultrasonic wave field vary depending on the dimensions of the micro particles and the sound characteristics, a standing wave field can be used to separate particles of the same size from other particles in a group, or to remove particles having different characteristics.

Further features of the invention, its nature and various advantages will be more apparent from the accompanying drawings and following detailed description of the invention.

DESCRIPTION OF THE PREFERRED EMBODIMENT

Figure 1:
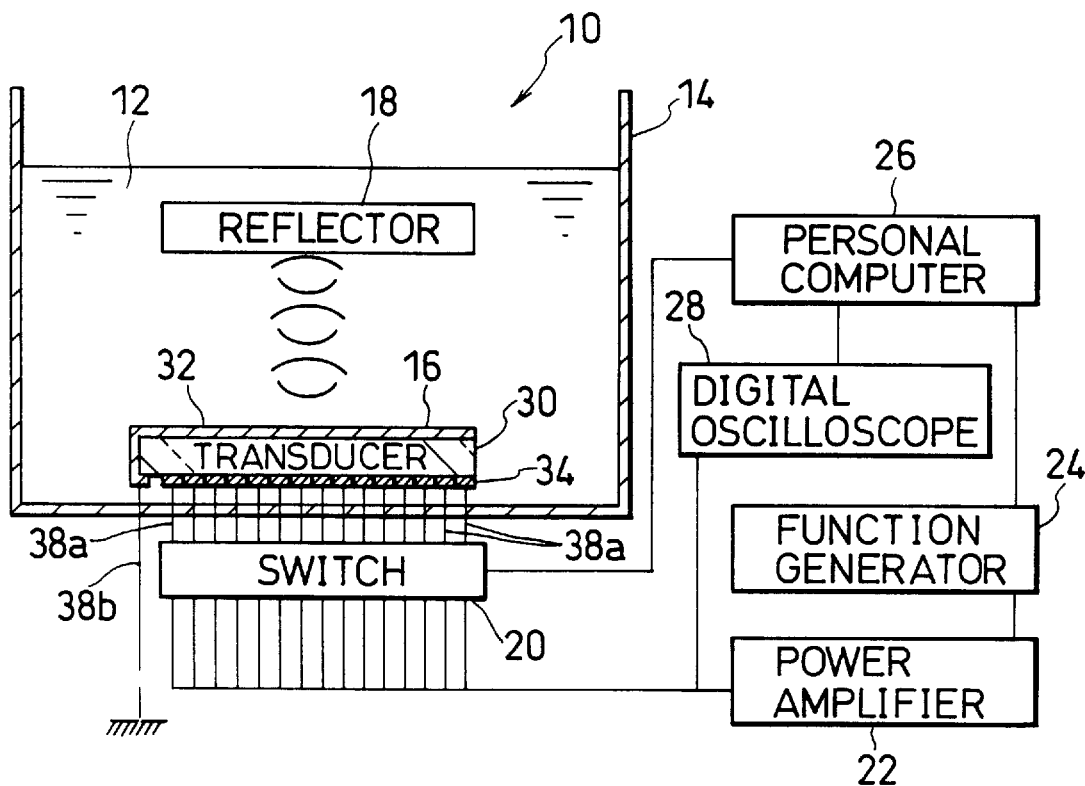
FIG. 1 is an illustrative view of an example of a non-contact micromanipulation apparatus according to the present invention.

FIG. 1 shows an example of a non-contact micromanipulation apparatus 10 for implementing the non-contact micromanipulation method of the present invention. With reference to FIG. 1, the non-contact micromanipulation apparatus 10 comprises an ultrasound transducer 16 and a reflector 18 disposed in a tank 14 filled with a liquid medium 12 and, outside the tank 14, a switch 20, a power amplifier 22, a function generator 24, a personal computer 26 and a digital oscilloscope 28. The liquid medium 12 may be any liquid medium that propagates sound with little attenuation of ultrasonic energy and does not produce any change in the micro particles being manipulated. Water, including pure water, alcohol and oil are exemplary examples of such a liquid medium.

Figure 2A:
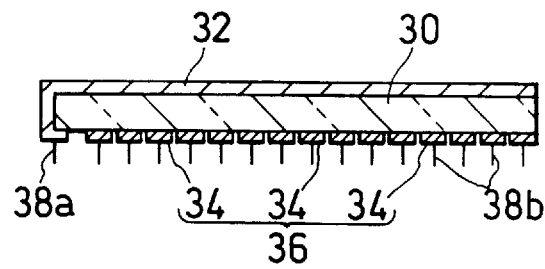
FIG. 2(a) is a cross-sectional view along line 2a—2a of FIG. 2(b) of an example of an ultrasound transducer used in the apparatus of FIG. 1.
Figure 2B:
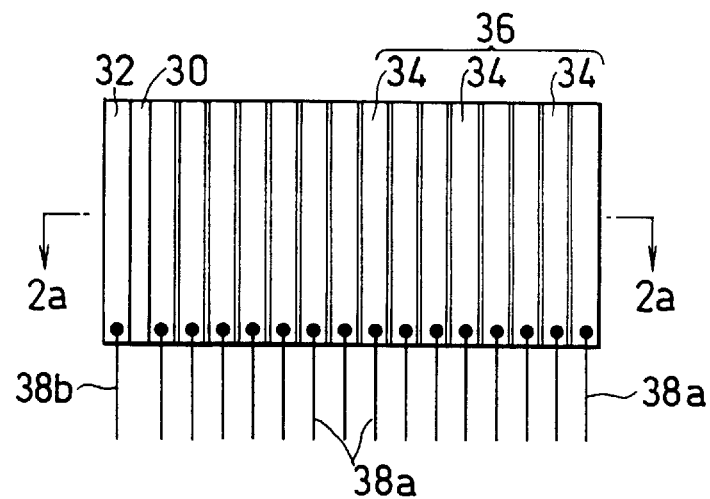
FIG. 2(b) is a view of the reverse surface of the ultrasound transducer shown in FIG. 2(a).

With reference to FIGS. 2(a) and 2(b), the ultrasound transducer 16 comprises a rectangular transducer plate 30 formed of a piezoelectric ceramic material or the like, a surface electrode 32 that wholly covers a first principal surface of the transducer plate 30 and also wraps around one end of the transducer plate 30 to cover an edge face and part of a second principal surface of the transducer plate 30 in the vicinity of the edge face, and a reverse surface electrode 36 on the second principal surface of the transducer plate 30, the reverse surface electrode 36 being constituted as a plurality of separate, short electrode strips 34 arranged in parallel. On the side of the transducer plate 30 on which the reverse surface electrode 36 is formed, connecting leads 38a and 38b are connected to one end of the electrode strips 34 and surface electrode 32 in order to allow a voltage from an external source to be applied to the electrodes. When via these leads 38a and 38b a prescribed alternating voltage is applied across the surface electrode 32 and one or a multiplicity of the electrode strips 34 constituting the reverse surface electrode 36, at the part where the electrode strip or strips are subjected to the alternating voltage, the transducer plate 30 is driven at a prescribed frequency, radiating ultrasound into the liquid medium 12 at a prescribed frequency.

The ultrasound transducer 16 has a prescribed resonant frequency that is determined by such factors as the shape and material of the transducer plate 30. It is preferable that this resonant frequency be within applied ultrasonic frequency range described below, since, assuming the voltage applied is the same, a radiated ultrasonic frequency that is considerably different from the resonant frequency will result in a major decrease in the ultrasonic intensity. The surface electrode 32 is grounded via lead 38b, and the electrode strips 34 are each connected to the external switch 20 via a lead 38a. The reverse surface electrode 36 is arranged facing down toward the bottom of the tank 14.

The reflector 18 is disposed in the tank 14 above the transducer 16 from which the reflector 18 is spaced apart by a prescribed distance with the reflecting surface of the reflector 18 arranged to be parallel to the first principal surface of the transducer 16, so that the reflector 18 reflects ultrasound radiated by the ultrasound transducer 16. The reflector 18 may be constituted as a flat plate of a ceramic material or the like.

The apparatus is provided with a switch 20 having a publicly known configuration that is used to select the electrode strips 34 to which a voltage is to be applied, and to switch from electrode strip 34 to electrode strip 34, under the control of personal computer 26 located outside the tank 14. The output side of the switch 20 is connected to the electrode strips 34 via the leads 38a, while the input side is connected to the function generator 24 via the power amplifier 22. By means of this configuration, an alternating voltage having a prescribed frequency and prescribed wave form such as a sinusoidal or square wave form is generated by the function generator 24, amplified by the power amplifier 22 and applied to one or multiple selected electrode strips 34 of the ultrasound transducer 16. The personal computer 26, function generator 24 and power amplifier 22 may each be of known types.

In this aspect of the invention, digital oscilloscope 28 is provided between the output side of the power amplifier 22 and personal computer 26 to compensate for variation in the gain of the power amplifier 22 caused by variation in load, that is, for changes in the voltage applied to a single electrode strip 34 brought about by changes in the number of electrode strips 34 to which a voltage is applied. The output voltage of the power amplifier 22 is measured by the digital oscilloscope 28 and the measured value is input to the personal computer 26, which regulates the output voltage of the function generator 24 to bring the measured output voltage within a prescribed range of deviation from a target value, so that the voltage applied to a single electrode strip 34 is substantially the target value, regardless of the number of electrode strips 34 to which voltage is applied.

For the non-contact micromanipulation method according to this invention, it is preferable to use an ultrasonic frequency of not less than 1 MHz. A frequency that is less than 1 MHz will reduce the degree of spatial changes in sound pressure distribution to the point where the force of the sound radiation pressure urging the micro particles toward the nearest node will not enough for full entrapment. The upper limit for the ultrasonic frequency is determined by the following two conditions. First, the wavelength of the ultrasound in the medium should preferably be at least five times the size of the micro particles: a frequency corresponding to that wavelength forms the upper frequency limit. Next, when the micro particles are sufficiently small, there is the upper limit of the resonant frequency of the ultrasound transducer 16 obtained when the prescribed voltage is applied. This is because while it is necessary to decrease the thickness of the transducer plate in order to increase the resonant frequency of the ultrasound transducer 16 without changing the transducer plate material, to ensure that a standing wave field can be generated that is able to provide stable trapping of micro particles when a prescribed voltage is applied to the ultrasound transducer 16, the thickness of the transducer plate cannot be reduced below a certain level. The upper limit will be around 10 MHz when the transducer plate used is a piezoelectric ceramic plate.

In addition to the ultrasonic frequency used in the method of the invention being within the above upper and lower limits, it is also preferable that the frequency be in the vicinity of a frequency whereby the distance L by which the ultrasound transducer 16 and the reflector 18 are separated and radiated ultrasonic frequency λ satisfy the following relational equation (1), in which n is a sufficiently large natural number.

$$L=(2n+1)\lambda/4 \qquad (1)$$

This ensures that conditions for resonance between the ultrasound transducer 16 and the reflector 18 are satisfied and holds down attenuation of standing wave field energy in the liquid medium 12, thereby enabling stable trapping of micro particles with less electrical power.

In the non-contact micromanipulation method of this invention, the ultrasound can be radiated from the ultrasound transducer 16 as a continuous wave or as a burst wave. "Burst wave" here refers to a wave motion consisting of recurring, short-duration periods of ultrasound radiation and non-radiation. When ultrasound is radiated in pulses, the burst wave duty ratio, in other words, the proportion of the ultrasound radiation time period occupied by the sum of the ultrasound radiation on and off time periods, that is, the periodic ultrasound radiation on and off cycle (hereinafter referred to as the repetition period), is set to an appropriate value. At a duty ratio of 100% a burst wave becomes a continuous wave. A burst wave repetition period is set to provide enough radiation time for the stable formation of a standing wave by the superposition of the traveling wave and reflected wave, and a short enough quiescent time. Hereinbelow, burst wave frequency refers to the frequency during burst wave ultrasound radiation, not to the frequency of ultrasound radiation and quiescent periods; that is, it does not refer to the reciprocal of the above repetition period.

While the non-contact micromanipulation method of the present invention has been described with reference to the manipulation of alumina particles, this is not limitative, as any micro particles may be used that have an impedance that is different from that of the liquid medium and reflect or absorb ultrasonic waves. After the micro particles to be manipulated have been dispersed in the liquid medium 12, the switch 20 is operated under the control of the personal computer 26 to select one or multiple electrode strips 34 to receive a voltage, and the function generator 24 is used to generate an alternating voltage at a prescribed frequency. The voltage is amplified by the power amplifier 22 and applied to the selected electrode strip or strips 34 continuously or intermittently according to a prescribed duty ratio, whereby the ultrasound transducer 16 is driven to radiate continuous or burst waves of ultrasound into the liquid medium 12 from the location of the electrode strip or strips 34 being driven.

The ultrasound thus radiated by the ultrasound transducer 16 passes through the liquid medium 12 and is reflected by the reflector 18. The resulting superposition of the incident and reflected waves causes a standing wave field to be formed continuously or intermittently between the driving electrode strip or strips 34 and the reflector 18. In the standing wave field thus formed, the ultrasonic pressure amplitude is high and acts to move the micro particles toward nodes set at half wavelength intervals by the properties of the micro particles and medium, thereby causing the micro particles to be trapped in the vicinity of the stable points in the standing wave field.

By operating the switch 20 under the control of the personal computer 26, the electrode strip or strips 34 selected as the driving electrode strip or strips are electrically switched to one or multiple adjacent electrode strips 34 to move the driving portion of the ultrasound transducer 16, thereby moving the standing wave field in the direction in which the electrode strips 34 are arrayed. As a result, micro particles stably trapped in the region of nodes located at half wavelength intervals along the standing wave field centered on the location of what was the driving electrode strip prior to the switching are subjected to a force urging them toward the new center axis of the standing wave field. Thus, the micro particles are moved in the direction in which the electrode strips are arrayed, to a region above the new center axis which includes nodes where the micro particles are stably trapped. Immediately prior to the switchover the alternating voltage applied to the driving electrode strip is suddenly reduced to zero while at the same time the alternating voltage applied to the new driving electrode strip is suddenly raised to the prescribed level. However, prior to the switchover the alternating voltage applied to the driving electrode strip can be gradually reduced to zero while at the same time the alternating voltage applied to the new driving electrode strip is gradually raised to the prescribed level.

As the driving electrode strips 34 to which a prescribed voltage is applied in the above micro particle trapping operation, it is preferable to use two or more adjacent electrode strips 34, since this allows the width of the formed standing wave field in the direction of the array of electrode strips 34 to be increased by an amount corresponding to the number of electrode strips 34 to which the voltage is applied simultaneously. In moving the trapped micro particles, it is more preferable to move the standing wave field in the arrangement in which the selected electrode strips 34 comprise an array of two or more adjacent electrode strips, by applying a voltage to the adjacent electrode strip 34 at one end of the array of two or more adjacent electrode strips 34 and switching off the voltage to the electrode strip 34 located at the other end of the array of two or more adjacent electrode strips 34, since the result is that the width of the standing wave field in the direction of the array of electrode strips is increased by an amount that corresponds to the number of the electrode strips 34 to which the voltage is being simultaneously applied, and the expanded standing wave field is moved by the unit amount of movement provided by one electrode strip.

When the driving electrode is two adjacent electrode strips 34, different voltages can be applied to each, whereby in accordance with the ratio between the voltage applied to one of the two electrode strips 34 and the voltage applied to the other of the two electrode strips 34, the point along the electrode strip array at which the standing wave field sound pressure is at its highest is shifted from the central axis of the ultrasound transducer where the two electrode strips 34 are located toward the electrode strip 34 having the higher applied voltage. This enables micro particles to be trapped at any point along the direction in which the electrode strips 34 are arrayed by setting each voltage at an appropriate level.

When in accordance with the non-contact micromanipulation method of this invention the ultrasound radiated by the ultrasound transducer 16 is radiated as burst waves having a prescribed duty ratio, a standing wave field is formed intermittently in the liquid medium 12 at time divisions that are substantially equal to the burst wave duty ratio. During the periods when a standing wave field is not formed, micro particles start to be moved from the entrapment position by gravity, buoyancy, acoustic streaming forces and other such external disturbances. However, during periods in which there is a standing wave field, the micro particles are returned to the vicinity of the stable points by an entrapment force from an acoustic radiation pressure that is substantially as strong as the entrapment force of a continuous standing wave field. Also, since the standing wave field is formed intermittently, during the periods when there is no standing wave field the liquid medium 12 is not subjected to a force, so the velocity of an acoustic streaming generated in the liquid medium 12 by the standing wave field is controlled.

That is, the micro particle trapping force exerted by the acoustic radiation pressure can be thought of as proportional to the square of the sound field pressure amplitude, and the driving force of the acoustic streaming can be thought of as being proportional to the time-average square of the field pressure amplitude. Therefore, radiating the ultrasound as a burst wave with a prescribed duty ratio makes it possible to maintain at a prescribed level the standing wave field radiation force used to trap the micro particles while at the same time reducing the driving force of the acoustic streaming, enabling the acoustic streaming velocity to be adequately controlled.

When the driving electrode strips are two adjacent electrode strips 34, and voltages are applied to the two electrode strips 34 at intervals corresponding to a prescribed duty ratio, intermittently forming a standing wave field between the driving electrode strip location on the ultrasound transducer 16 and the reflector 18, a duty ratio differential corresponding to the voltages applied to the two electrode strips can be applied, producing a trapping force that enables micro particles to be trapped at a desired point along the electrode strip array. Also, the adjacent electrode strips can be supplied with alternating current having mutually differing phases.

The method of non-contact micromanipulation using ultrasound according to the present invention was implemented and evaluated as follows.

Silicon rubber was used to attach an ultrasound transducer 16 as shown in FIG. 2 to the bottom arm of a U-shaped fixing bracket. A flat, reflector plate 18 formed of piezoelectric ceramic material was attached to the top arm of the bracket, 30 mm away from the transducer 16. The bracket with the attached transducer and reflector was then placed in a tank 14 filled with water as the liquid medium. The ultrasound transducer 16 measured 20 mm wide, 40 mm long and approximately 1 mm thick, and was provided with a reverse surface electrode 36 constituted by 15 electrode strips 34 each 20 mm long by 2 mm wide, arranged at a spacing of 0.5 mm. The ultrasound transducer 16 had a resonant frequency of 2.19 MHz, with some slight variation in the vicinity of the electrode strips 34.

A personal computer 26 was loaded with a control program whereby the number of driving electrode strips was set at one and operation of a switch 20 was controlled so that a voltage output by a power amplifier 22 was first applied only to the selected electrode strip 34. A function generator 24 was then used to generate an sinusoidal alternating voltage having a frequency of 2.19 MHz, which was then amplified to 40 Vpp by the power amplifier 22 and applied as a step function to the single electrode strip 34 selected as the driving electrode to thereby drive the ultrasound transducer 16 to radiate ultrasound in the water centering on the location of the electrode strip 34 and thus form a standing wave field between the ultrasound transducer 16 and the reflector 18. The amplifier used had a rated gain of 50 dB, which was controlled to within ±5% of the set value to prevent the voltage being affected by the number of driving electrode strips used. Alumina micro particles having an average diameter of 80 μm were suspended in water and the suspension was injected by pipette into the standing wave field, and it was confirmed that the alumina particles were trapped at half wavelength intervals between the driving electrode strip and the reflector.

Under the control of the personal computer 26, the switch 20 was operated so that first a voltage was applied to the three adjacent electrode strips at the right end, then a voltage was applied to the next electrode strip on the left while at the same time the voltage to the electrode strip at the right end was switched off. This sequence of voltage application and termination was repeated in an endeavor to move the alumina particles.

Figure 3:
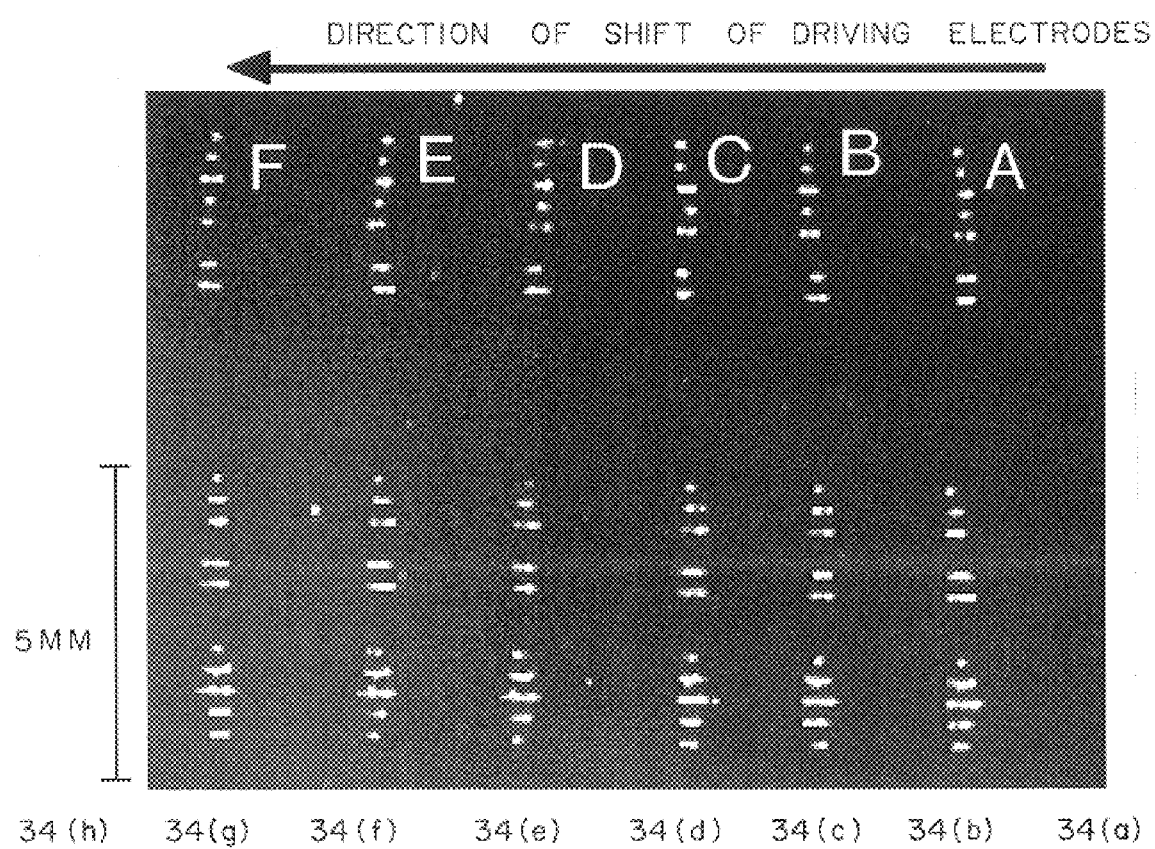
FIG. 3 is a six-exposure photograph illustrating how micro particles are moved by changing the electrode strips to which a voltage is applied, in accordance with the method of the present invention.

FIG. 3 is a photograph of the results. When a voltage was applied to electrode strips 34a, 34b and 34c, alumina particles were trapped at half wavelength intervals in the ultrasound field at position A. When a voltage was then applied to electrode strip 34d and the voltage to electrode strip 34a was switched off, the alumina particles moved to position B. When the voltage was then applied to electrode strip 34e and the voltage to electrode strip 34b was terminated, the alumina particles moved to position C. Thus, the alumina particles were moved to position F by repeating this sequence of switching on the voltage to the next electrode strip to the left while switching off the voltage to the electrode strip at the right end. Each step moved the trapped alumina particles by about 2.5 mm, which corresponds to the distance of wave field movement per electrode (the sum of the 2.00 mm width of an electrode strip plus the 0.5 mm gap between electrode strips).

Figure 4A:
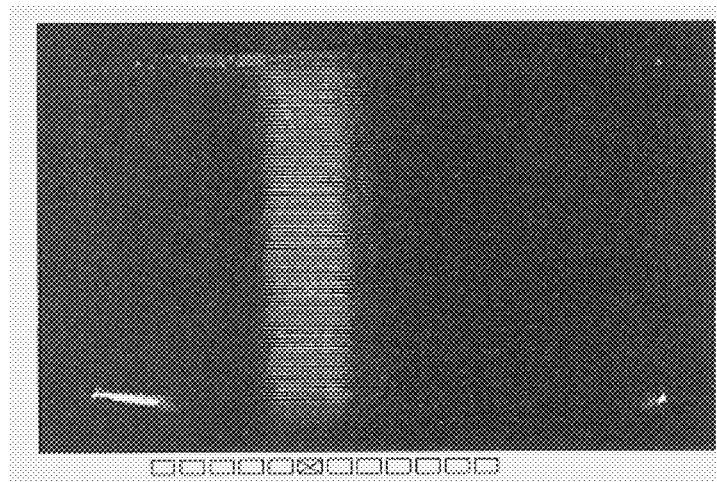
FIGS. 4(a), (b) and (c) are photographs illustrating how a standing wave field, made visible by the schlieren method, is moved by applying a voltage to electrode strips.
Figure 4B:
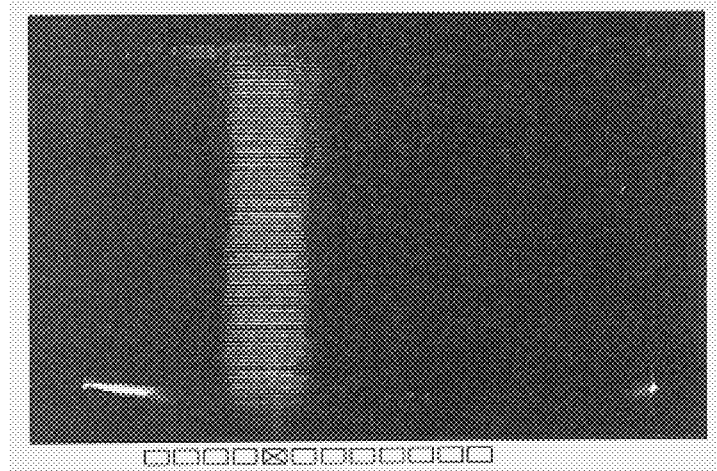
Figure 4C:
Figure 5A:
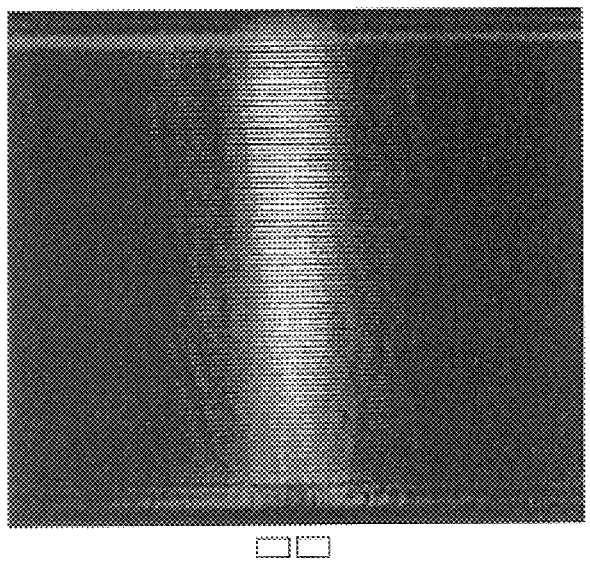
FIG. 5 shows photographs of standing wave fields created by applying currents of different phases to two electrode strips, with the phase difference being zero in the case of FIG. 5(a), 60° in the case of FIG. 5(b), 120° in the case of FIG. 5(c), and 180° in the case of FIG. 5(d).
Figure 5B:
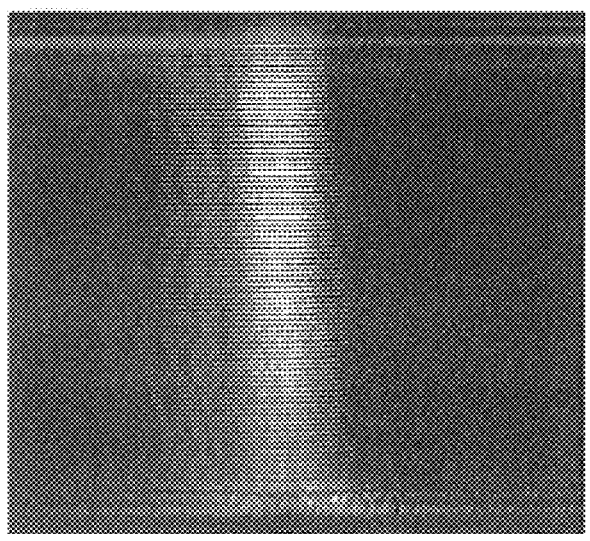
Figure 5C:
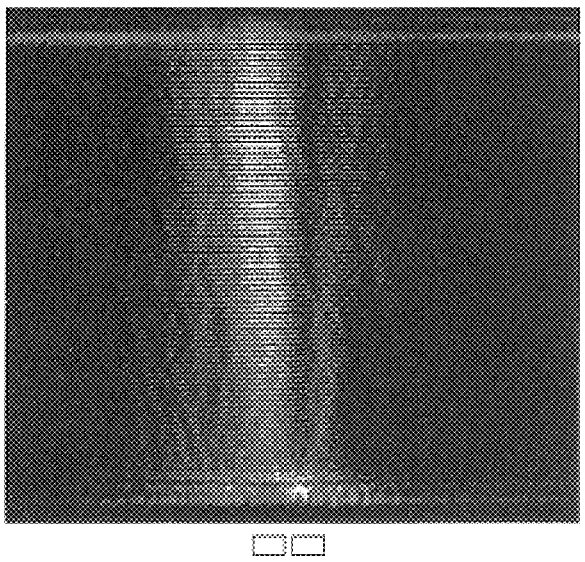
Figure 5D:
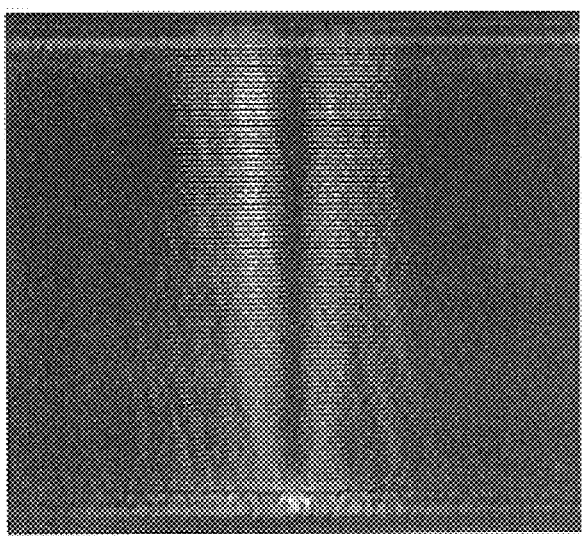

FIGS. 4(a) to 4(c) are photographs of a standing wave field formed as described above and rendered visible by the schlieren method. The short white horizontal lines in the photographs indicate the formation of the standing wave field; the reflector was arranged at the top and the ultrasound transducer at the bottom. The small white boxes beneath each photograph represent electrode strips; a box with an x mark represents an electrode strip to which voltage has been applied. With reference to FIGS. 4(a) to 4(c), it was confirmed that by changing the applied voltage, the position at which the standing wave field forms could be changed, and a field formed that is wider than the electrode strips and overlaps adjacent electrode strips. This means that even when just a single driving electrode strip is used, trapped micro particles can be moved without escaping from the standing wave field.

With another arrangement, not illustrated, it was confirmed that the type of micro particle movement shown in FIG. 3 could also be achieved by using as the driving electrode a plurality of adjacent electrode strips, applying a voltage to an adjacent electrode strip at one end of the array of two or more electrode strips while switching off the voltage to the electrode strip at the other end of the array of two or more electrode strips. This arrangement produced relatively smooth movement of micro particles. The schlieren method was also used to confirm that the standing wave fields formed with the arrangement were broader and able to trap micro particles over a broader range.

In the above-described embodiment, a step function of zero is used for the amplitude of the alternating voltage prior to application to the driving electrode strip simultaneously with a step function of a prescribed value for the amplitude of the alternating voltage applied to the driving electrode strip after the switching. However, as described below, it was confirmed that the alumina particles could still be moved even when the amplitude of the alternating voltage prior to application to the driving electrode strip was gradually decreased to zero and the amplitude following the switching gradually increased to the prescribed value.

Namely, when a single electrode strip located in the vicinity of the center of the ultrasound transducer was used as the driving electrode strip and a voltage of about 30 Vpp was applied to that electrode strip to drive the transducer to radiate ultrasound and form a standing wave field, alumina particles were trapped within the field over the driving electrode strip. When a voltage that was gradually raised to 30 Vpp was then applied to the electrode strip on the left of the driving electrode strip, and the voltage being applied to the now-former driving electrode strip was gradually reduced to zero, the field that had been over the former driving electrode strip slowly moved over the new driving electrode strip. The outcome was that the particles trapped above the first electrode strip moved together with the field to the region above the second electrode strip.

Figure 6:
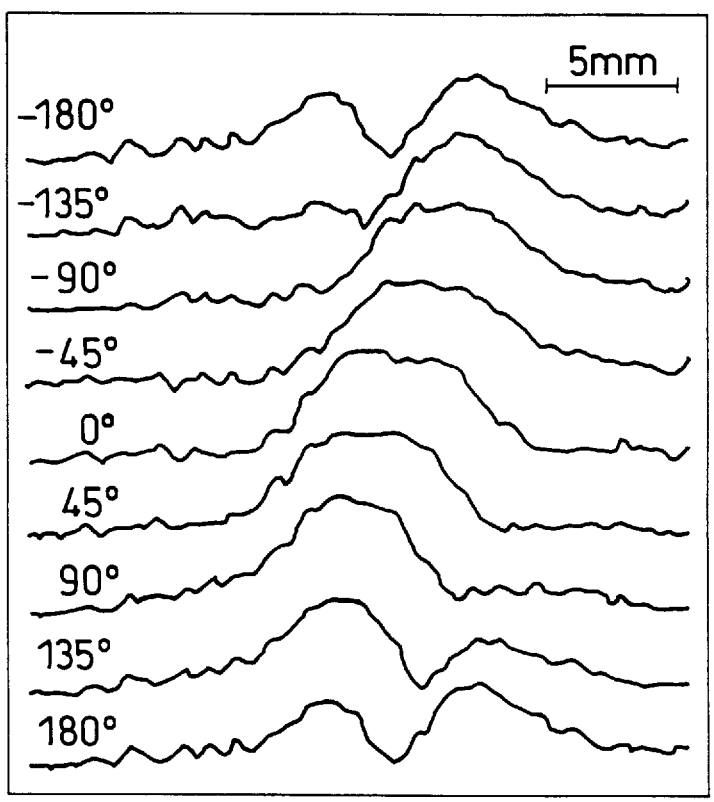
FIG. 6 is a graph of the brightness distribution of schlieren images when the phase difference between currents supplied to the two electrode strips is changed in 45° increments.
Figure 7:
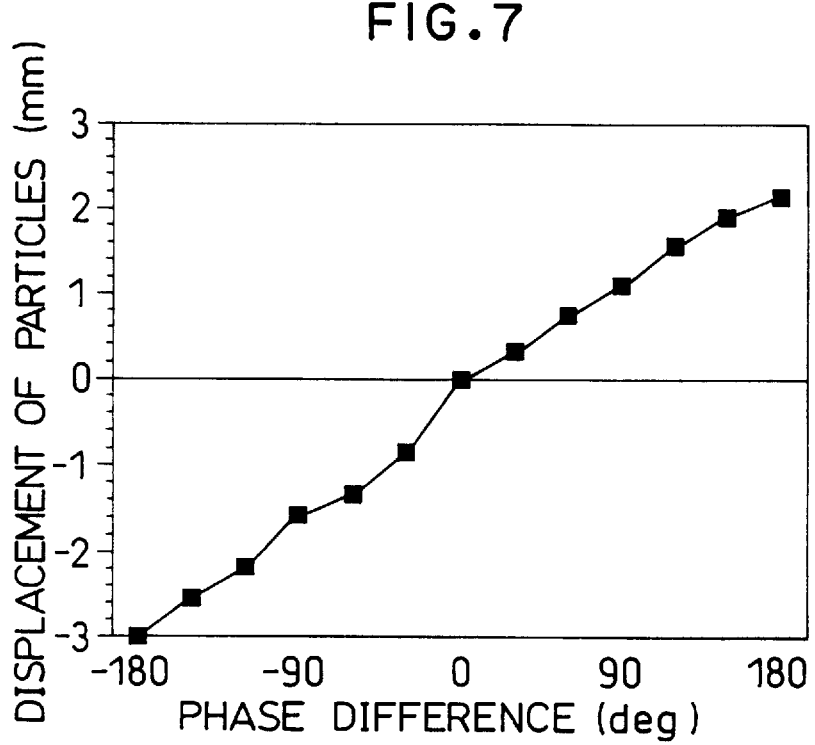
FIG. 7 is a graph produced by plotting movement of alumina particles over a phase difference ranging from −180° to +180°.

Next, when the schlieren method was used to observe how standing wave field formation was changed when a pair of adjacent electrode strips driven by a sinusoidal alternating voltage at the same frequency of 2.19 MHz (the resonant frequency of the transducer) were supplied with alternating current having mutually different phases, horizontal movement of the field was observed. FIG. 5 shows photographs, obtained using the schlieren method, of standing wave fields resulting from a phase differential of zero in the case of FIG. 5(a), 60° in the case of FIG. 5(b), 120° in the case of FIG. 5(c) and 180° in the case of FIG. 5(d). FIG. 6 shows the brightness distribution of schlieren images along lines between the transducer and reflector when the phase differential was adjusted from −180° to +180° in 45° increments. This shows that changes in the phase differential was accompanied by the movement of powerful fields (the bright areas). Alumina particles inserted into the fields were smoothly moved approximately 5 mm.

While the present invention has been described in the foregoing with reference to specific embodiments, it will be understood by those skilled in the art that the invention is not limited to the examples but that various changes may be made and equivalents may be substituted for elements thereof so long as these do not depart from the gist and scope of the invention defined herein.

As will be clear from the foregoing description, in accordance with the non-contact micromanipulation method of the present invention, a standing ultrasonic wave field may be formed in a liquid medium in a narrow region centering on a driving electrode strip in an array of electrode strips. Micro particles can be trapped in nodes existing at half wavelength intervals in this narrow standing wave field, and the region with the trapped particles can be moved in one direction, which is the direction in which the electrode strips are arrayed, from adjacent driving electrode strip to adjacent driving electrode strip, parallel to the operating surface of the transducer. As such, micro particles can be securely moved a prescribed distance parallel to the transducer surface at a precision determined by the spacing between the strip-shaped electrodes.

Since in the non-contact micromanipulation method of the present invention micro particles are moved by ultrasonic wave force, the method provides the various advantages of using ultrasound such as the ability to securely trap and manipulate a wide range of micro particles, low-priced apparatus, and safety. Moreover, the micro particles are virtually unaffected by dust and wear and the like, and the manipulation does not contaminate the micro particles.

Furthermore, in accordance with the first aspect of the non-contact micromanipulation method of the invention, the narrow standing wave field can be expanded by an amount corresponding to the number of driving electrode strips used, improving the unit contribution that each electrode strip makes to the movement, broadening the range of micro particles that can be trapped, and resulting in smoother movement.

In accordance with the second preferred aspect of the invention the selected electrode strip is comprised by two adjacent electrode strips to each of which a different voltage is applied, whereby in accordance with the ratio between the voltage applied to one of the two electrode strips and the voltage applied to the other of the two electrode strips, the point along the electrode strip array at which the standing wave field sound pressure is at its highest undergoes a shift from the central axis of the ultrasound transducer, where the two electrode strips are located, toward the electrode strip having the higher applied voltage. This enables the position of trapped micro particles to be steplessly changed between the two electrode strips.

In the third preferred aspect of the invention, in accordance with the ratio between a duty ratio of burst waves radiated via one of the two electrode strips and a duty ratio of burst waves radiated via the other of the two electrode strips, as in the above arrangement of the second aspect, the point along the electrode strip array at which the standing wave field sound pressure is at its highest undergoes a shift from the central axis of the ultrasound transducer where the two electrode strips are located toward the electrode strip with the higher duty ratio. Since radiating burst waves causes standing wave fields to be formed intermittently at time intervals that are substantially equal to the duty ratio of the burst waves in the medium, the driving force of the medium flow referred to as the acoustic streaming that can be considered as being proportional to the time-average square of the sound field pressure amplitude can be decreased, allowing the acoustic streaming velocity to be adequately controlled while at the same time maintaining the radiation force of the ultrasonic standing wave field that traps the micro particles and can be considered as being proportional to the square of the sound field pressure amplitude.

The above-described non-contact micromanipulation method can advantageously be implemented by the non-contact manipulation apparatus according to the present invention.

What is claimed is:

1. A method of non-contact micromanipulation using ultrasound, comprising:

disposing in a liquid medium in which micro particles are distributed, an ultrasound transducer comprising a transducer plate, a surface electrode wholly covering a first principal surface of the transducer plate and a reverse surface electrode on a second principal surface of the transducer plate comprising a plurality of short electrode strips arranged in parallel, and a reflector set in parallel opposition to the first principal surface of the transducer plate from which the reflector is spaced apart by a prescribed distance, applying a voltage to at least one electrode strip selected from the plurality of electrode strips to radiate ultrasound to form a standing wave field between the ultrasound transducer and the reflector to trap micro particles, electrically switching the voltage being applied to the selected electrode strip to an adjacent electrode strip to move the standing wave field by moving a position of ultrasound radiated by the ultrasound transducer to thereby move the trapped micro particles in a direction in which the electrode strips are arrayed, wherein the selected electrode strip comprises two adjacent electrode strips to each of which a different voltage is applied.

2. A manipulation method according to claim 1, wherein the selected electrode strip comprises an array of two or more adjacent electrode strips, the standing wave field is moved by applying a voltage to an electrode strip at one end of the array of two or more adjacent electrode strips and switching off a voltage to an electrode strip located at the other end of the array of two or more adjacent electrode strips.

3. A method of non-contact micromanipulation using ultrasound, comprising:

disposing in a liquid medium in which micro particles are distributed, an ultrasound transducer comprising a transducer plate, a surface electrode wholly covering a first principal surface of the transducer plate and a reverse surface electrode on a second principal surface of the transducer plate comprising a plurality of short electrode strips arranged in parallel, and a reflector set in parallel opposition to the first principal surface of the transducer plate from which the reflector is spaced apart by a prescribed distance, applying a voltage to at least one electrode strip selected from the plurality of electrode strips to radiate ultrasound to form a standing wave field between the ultrasound transducer and the reflector to trap micro particles, electrically switching the voltage being applied to the selected electrode strip to an adjacent electrode strip to move the standing wave field by moving a position of ultrasound radiated by the ultrasound transducer to thereby move the trapped micro particles in a direction in which the electrode strips are arrayed, wherein the selected electrode strip comprises two adjacent electrode strips to each of which an alternating voltage having a different phase is supplied.

4. A method of non-contact micromanipulation using ultrasound, comprising:

disposing in a liquid medium in which micro particles are distributed, an ultrasound transducer comprising a transducer plate, a surface electrode wholly covering a first principal surface of the transducer plate and a reverse surface electrode on a second principal surface of the transducer plate comprising a plurality of short electrode strips arranged in parallel, and a reflector set in parallel opposition to the first principal surface of the transducer plate from which the reflector is spaced apart by a prescribed distance, applying a voltage to at least one electrode strip selected from the plurality of electrode strips to radiate ultrasound to form a standing wave field between the ultrasound transducer and the reflector to trap micro particles, electrically switching the voltage being applied to the selected electrode strip to an adjacent electrode strip to move the standing wave field by moving a position of ultrasound radiated by the ultrasound transducer to thereby move the trapped micro particles in a direction in which the electrode strips are arrayed, wherein the selected electrode strip comprises two adjacent electrodes strips, ultrasound corresponding to ultrasonic waves generated via the two electrode strips is radiated as burst waves, and the burst waves generated via the electrode strips are generated with a mutually different duty ratio.

5. An apparatus for non-contact micromanipulation, comprising:

an ultrasound transducer disposed in a liquid medium in which micro particles are distributed, said ultrasound transducer comprising a transducer plate, a surface electrode wholly covering a first principal surface of the transducer plate and a reverse surface electrode on a second principal surface of the transducer plate comprising a plurality of short electrode strips arranged in parallel, a tank filled with said liquid medium, a reflector set in the liquid medium in parallel opposition to the first principal surface of the transducer plate from which the reflector is spaced apart by a prescribed distance L expressed by $L=(2n+1)\lambda/4$ wherein n is a natural number and $\lambda$ is a radiated ultrasound frequency, a standing wave field being formed between the ultrasound transducer and the reflector by ultrasound radiated by the ultrasound transducer, switching means to selectively switch an applied voltage to the plurality of electrode strips, and control means for controlling selectively switching operation of the switching means.

6. An apparatus for non-contact micromanipulation according to claim 5, wherein said ultrasound transducer is attached with silicone rubber to said tank filled with said liquid medium.

* * * * *

UNITED STATES PATENT AND TRADEMARK OFFICE
CERTIFICATE OF CORRECTION

PATENT NO. : 6,055,859
DATED : May 2, 2000
INVENTOR(S) : Teruyuki KOZUKA, et al.

It is certified that error appears in the above-identified patent and that said Letters Patent is hereby corrected as shown below:

On the Title page, the Inventor information, item [75], and the Assignee information, item [73], are listed incorrectly.

Item [ 75 ] should read as follows:

--- [75] Inventors: Teruyuki Kozuka, Okazaki-shi; Hideto Mitome, Kasugai-gun; Toru Tuziuti, Nagoya, all of Japan ---

-And -

Item [73] should read as follows:

--- [73] Assignee: Agency of Industrial Science & Technology, Ministry of International Trade & Industry, Tokyo, Japan ---

Signed and Sealed this

Tenth Day of April, 2001

*Attest:*

NICHOLAS P. GODICI

*Attesting Officer*    *Acting Director of the United States Patent and Trademark Office*